May 6, 1952

G. D. CLAPP 2,595,333

SILO UNLOADER

Filed Nov. 26, 1946

INVENTOR.
George D. Clapp,
BY
Cromwell, Greist & Warden
Attys.

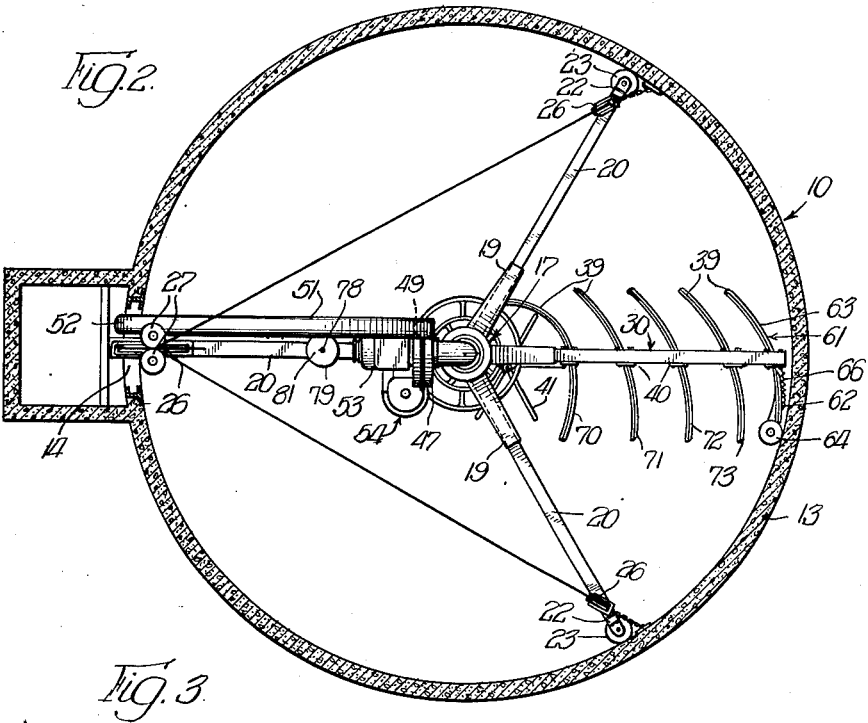

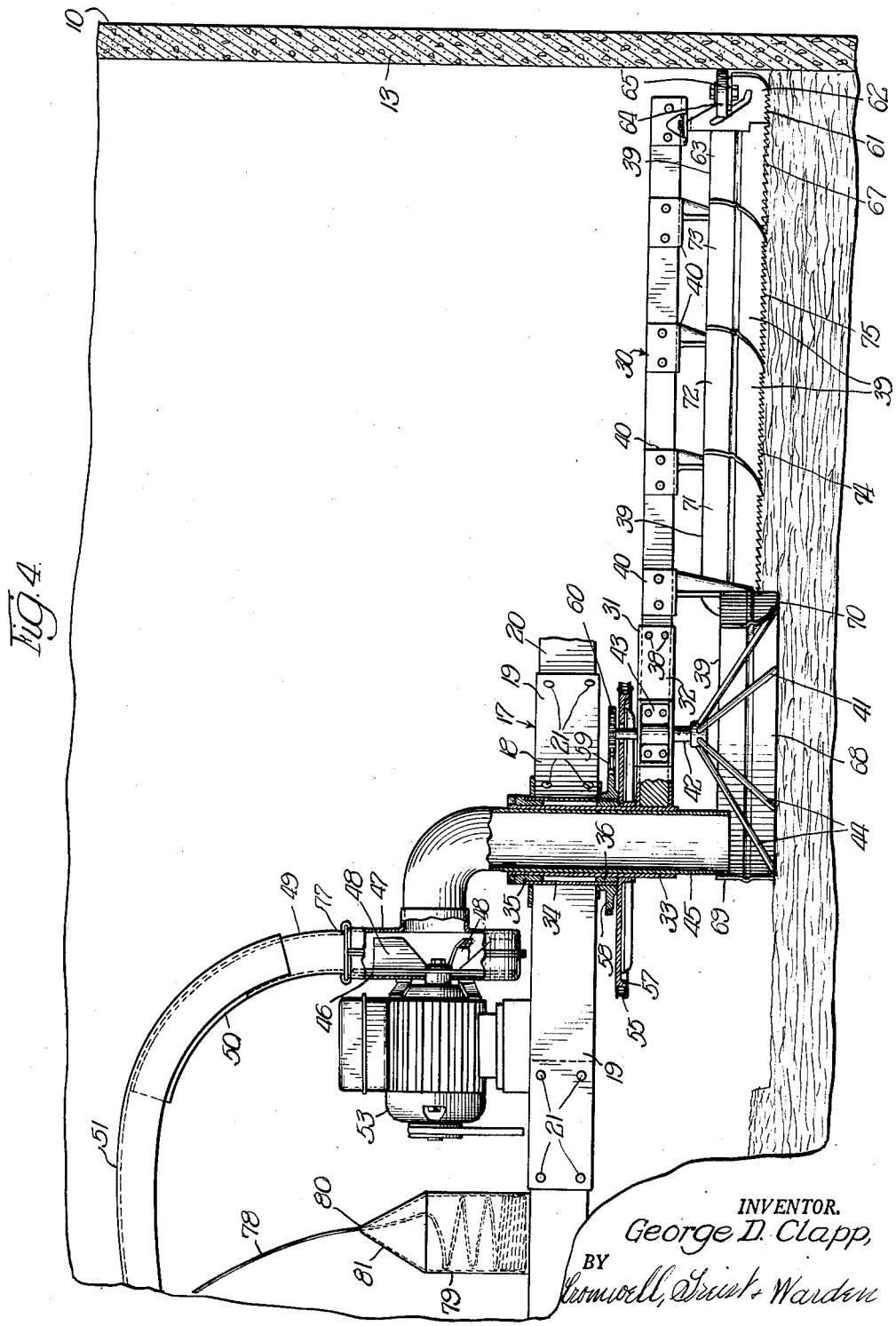

Patented May 6, 1952

2,595,333

UNITED STATES PATENT OFFICE 2,595,333

SILO UNLOADER

George D. Clapp, Oshkosh, Wis., assignor to Leach Company, Oshkosh, Wis., a corporation of Wisconsin Application November 26, 1946, Serial No. 712,322

7 Claims. (Cl. 214—17)

The present invention has to do with silo unloaders of the type disclosed in the earlier filed application of Elbert C. Leach, Otto F. Manthie and George D. Clapp, Serial No. 614,564 and now Patent No. 2,580,306 granted December 25, 1951, wherein the silage is cut loose from the upper surface of the silage in a silo by a descending rotor, carried in toward the center of the rotor, and there picked up by suction and discharged through an opening in the side of the silo.

The purpose of the invention, generally stated, is to provide an improved silo unloader of the type described with which any desired quantity of silage can be quickly, easily and safely removed from a silo.

One of the objects of the invention is to provide an improved unloader which is of simple sturdy construction, is inexpensive to manufacture, can be separated into relatively small sections to facilitate insertion through the narrow opening in the side of the silo, and is easy to assemble in place.

Another object is to provide an improved unloader which will remove all loosened silage from the underlying uncut surface, thereby materially reducing spoilage.

Another object is to provide an improved unloader which will clear the silage right up to the wall of the silo without injury to the wall irrespective of irregularities or variations in the shape or curvature of the latter.

Still another object is to provide an improved silo unloader which can be readily converted to cold weather operation by reversing the position of the edges of certain of the cutting blades.

Other more specific objects and advantages of the invention will be apparent to those skilled in the art upon a full understanding of the construction, arrangement and manner of operation of the improved unloader.

A preferred embodiment of the invention is presented herein by way of exemplification but it will of course be appreciated that the invention may be embodied in other structurally modified forms coming equally within the scope of the appended claims.

In the accompanying drawings:

Fig. 2 is a horizontal section through the upper portion of a silo showing the unloader in operative position;

Fig. 3 is a horizontal section through the unloader, taken immediately above the rotor arm, on the line 3—3 of Fig. 1;

Fig. 4 is a partially sectioned fragmentary side view of the unloader, showing the rotor arm in side elevation; and Fig. 5 is a perspective view of one of the intermediate cutting blades.

Figure 1:
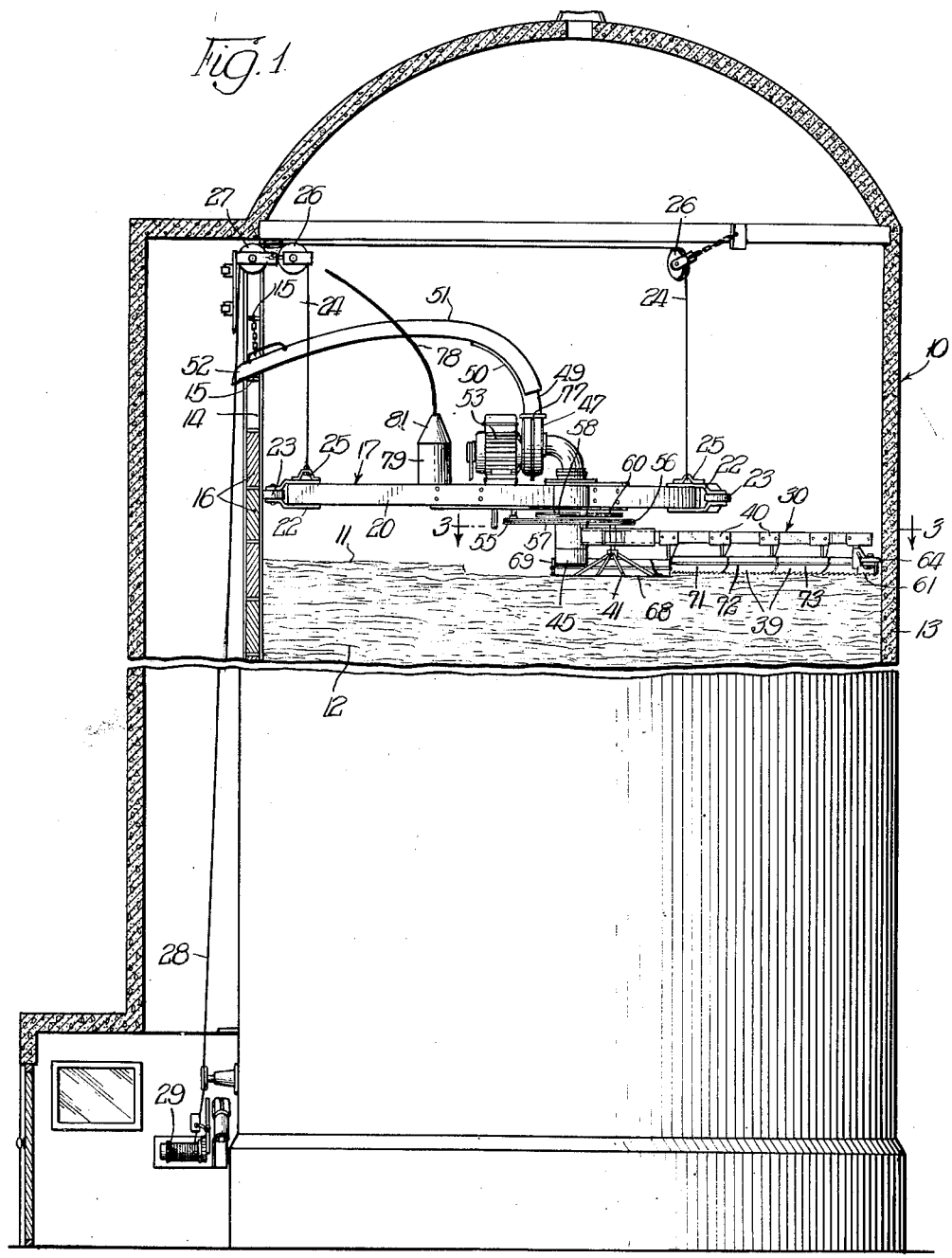
Fig. 1 is a partially sectioned side view of a silo equipped with an unloader constructed in accordance with the invention.

As will be observed in the drawings, the unloader is positioned in a silo 10 above the upper surface 11 of the silage 12. The silo 10 is approximately circular in form and is provided at one point in its side wall 13 with a narrow discharge opening 14. The opening 14 extends vertically for practically the entire height of the silo to facilitate unloading at any elevation and is cross-braced at regular intervals with horizontally extending bars 15 between which readily removable panels 16 are positioned for retaining the silage at the location of the opening. Except for the unloader, these silo features are more or less conventional and form no part of the present invention.

The unloader includes a vertically movable frame 17 of generally spider-like form which is adapted to be suspended centrally within the silo. The frame 17 includes a centrally apertured hub portion 18 of metal construction which is characterized by three radially extending channel members 19 within which the inner ends of radially extending beams 20 are detachably secured by bolts 21. The beams 20 are preferably of wooden construction and are provided at their outer ends with adjustably positioned brackets 22 in which horizontally disposed rollers 23 are journaled. The rollers 23 are adapted to engage with the wall 13 of the silo, whereby to center the frame 17 within the silo while at the same time permitting limited rotation of the frame in a horizontal direction under certain hereinafter mentioned conditions.

The frame 17 is freely suspended within the silo by means of three vertically extending cables 24, which cables are attached to the outer ends of the beams 20 by eye members 25 and extend upwardly in circumferentially spaced relation over pulleys 26 secured to the top of the silo. From the pulleys 26 the cables 24 extend horizontally over other pulleys 27 mounted at the top of the opening 14, after which they extend downwardly and are connected together to form a single operating cable 28. The cable 28 is secured to a suitable pay-out mechanism, which mechanism may include a drum 29 located in a conveniently accessible position at ground level.

The pay-out mechanism for the cable 28 may be similar to that disclosed in the above mentioned Leach, Manthie and Clapp application. By taking in on the cable 28 the unloader will be raised within the silo, while by paying out on the cable the unloader will be permitted to descend within the silo under its own weight.

It will be understood that the suspension provided by the cables 24 permits the frame 17 to rotate backwardly through a small angle under the resistance to forward rotary movement encountered by the hereinafter described rotor in scraping the silage loose. This tendency of the frame 17 to rotate backwardly is progressively and increasingly counteracted by the weight of the entire assembly, with the result that in normal operation the cables 24 will remain vertical or nearly so with the frame 17 suspended in substantially the position shown in Fig. 2.

A radially disposed rotor arm 30 is rotatably connected at its inner end to the frame 17 at the center of the latter. The arm 30 includes a mounting portion 31 of metal construction which is characterized by a radially extending channel member 32 and a vertically extending tubular member 33. The tubular member 33 extends upwardly through a tube 34 of somewhat larger diameter which forms the open center of the hub portion 18 of the frame 17, and is rotatably supported in the tube 34 by stationary upper and lower bearing members 35 and 36. The arm 30 also includes a radially extending beam 37, which beam is preferably of wooden construction. The inner end of the beam 37 is detachably secured within the channel member 32 by bolts 38.

The rotor arm 30 is provided with a plurality of curved angularly disposed cutting blades 39, which blades serve to cut the silage loose from the upper surface 11 and move the loosened silage in toward the center of the frame 17 upon rotation of the arm 30. The number of cutting blades employed depends on the length of the arm 30, which length is in turn determined by the diameter of the silo in which the unloader is used. The blades 39 are rigidly secured to the beam 37 by brackets 40, with the cutting circle of each blade overlapping that of the next outwardly disposed blade, as illustrated in Fig. 3.

The rotor arm 30 is also provided with a rotary agitator 41, which agitator is located adjacent the inner end of the arm and serves to agitate and further separate the already loosened silage upon receipt of the latter from the innermost of the cutting blades 39. The agitator 41 includes a vertically extending shaft 42 which is journaled in a bearing bracket 43 attached to the channel member 32 and a plurality of fingers 44 which extend radially from the shaft 42 in downwardly sloping positions. The lower ends of the fingers 44 terminate about flush with the lower edge of the innermost blade 39 and are arranged in a circle which substantially conforms to the curvature of the innermost blade.

The loosened silage is carried by the finger 44 of the agitator 41 along the inner face of the innermost blade 39 into a position directly beneath the lower open end of a vertically extending tube 45 and is there sucked upwardly into the tube by a rapidly moving upward current of air. The upward current of air in the tube 45 is produced by a rotary fan 46 which is located in a housing 47. The fan 46 is provided with a plurality of radially arranged blades 48. The tube 45 is stationary relative to the frame 17 and extends upwardly through the tubular member 33 of the rotor arm 30 to the inlet of the fan housing 47.

From the outlet of the fan housing 47 the silage is forcibly projected at a high rate of speed by the blades 48 of the fan through a second upwardly and laterally curved tube 49, which tube is open along the underside of its curved portion at 50 whereby to prevent the flying silage from being deposited on the same. Beyond the end of the tube 49 the still rapidly moving silage continues through and is deflected gradually downward by an outwardly extending trough 51 of inverted U-shaped cross-section, which trough is slidably nested over the upper curved end of the tube 49 and is curved in general conformity with the same. The curvature of the tube 49 extends through an arc of preferably 80°, and the curvature of the inner end of the trough 51 is about substantially the same center of curvature, with the result that as the frame 17 is lowered relative to the outer end of the trough 51 the trough will shift inwardly and the curved portions will further telescope, thus maintaining a gradual continuity of curvature of the discharge conduit.

The outwardly extending trough 51 is positioned between two of the three vertically extending suspension cables 24, in proximity to one of the cables, whereby to permit the lower ends of the cables to swing circumferentially in unison without interference when the frame 17 rotates part of one revolution in a reverse direction in reaction to the torque imposed by the rotor arm 30. The discharge end 52 of the trough 51 is adapted to be positioned between two of the cross bars 15 in the opening 14 in the wall of the silo and is adapted to be suspended from the upper one of such cross bars. The trough 51 serves to direct the silage downwardly outside the silo. Because of the readily slidable connection between the tube 49 and trough 51 the position of the discharge end 51 of the trough between the cross bars 15 need be changed only at infrequent intervals.

The fan housing 47 is attached to the frame of an electric motor 53, and the motor 53 is mounted on the hub portion 18 of the frame 17 at one side of the center of the latter. The motor 53 rotates the fan blades 48 in the housing 46.

The rotor arm 30 is driven from the motor 53 by a suitable power transmitting connection 54, which connection includes a small sprocket 55. A chain 56 is trained about the sprocket 55 and is also trained about a large sprocket 57, which large sprocket is rigidly secured to the tubular part 33 of the rotor arm 30. The rotor arm 30 is caused by the sprocket 55, chain 56 and sprocket 57 to rotate relative to the frame 17 about the axis of the pick-up tube 45 at a slow rate of speed, preferably in the neighborhood of about three revolutions per minute.

The agitator 41 is caused to rotate at a much higher rate of speed, say about twenty revolutions per minute, by the action of the rotor arm 30 in revolving relative to the stationary frame 17. For this purpose a sprocket 58 is secured to the tubular part 33 of the rotor arm just below the lower stationary bearing member 36. A chain 59 is trained about the sprocket 58 and is also trained about a relatively small sprocket 60 which is mounted on the upper end of the shaft 42 of the agitator. As the agitator 41 travels bodily in a circle about the sprocket 58 the chain 59 in engagement with the sprocket 58 will cause the sprocket 60 to turn in a reverse direction at a relatively high speed, thereby rotating the agitator.

The outermost blade 61 of the cutting blades 39 on the rotor arm 30 is provided with an outwardly spring-pressed front section 62 which is pivotally connected at its rear end to the front end of the fixed rear section 63. A roller 64 is journaled in a horizontal position on a flange 65 carried by the front end of the front section 62 and serves by engagement with the wall of the silo to deflect the front end of that section inwardly, against the resistance of a coil spring 66, whereby to maintain the front end of the front section 62 in close but slightly spaced relation to the wall of the silo. This enables the outermost blade 61 to cut the silage practically flush with the wall, irrespective of irregularities or variations in the shape or curvature of the wall. The lower cutting edges of the articulated front and rear sections 62 and 63 are preferably provided with serrations in the form of sharp pointed teeth 67, which teeth are inclined away from the direction of travel to prevent clogging and have inclined leading edges and more or less vertical trailing edges to afford sharp points.

The innermost blade 68 on the rotor arm 30 is preferably of generally semi-circular form and is provided with a rear end portion 69 which terminates in a position substantially tangential to the far side of the lower open end of the pick-up tube 45. The blade 68 conforms rather closely to one side of the circular path of the ends of the fingers 44 of the agitator 41. The front end portion 70 of the blade 68 diverges outwardly with respect to the agitator, whereby to gather the loosend silage for delivery into a position directly beneath the pick-up tube. The lower cutting edge of the blade 68 is preferably plain, as distinguished from being sharply serrated.

The intermediate blades 71, 72 and 73 are made readily detachable with respect to the brackets 40, and are preferably provided with optionally usable plain and serrated cutting edges 74 and 75, the teeth on the serrated edges being similar to those on the outermost blade 61. By reversing the positions of the intermediate blades in the brackets 40 either a sharp cutting action, for freezing conditions in winter, or a more moderate cutting action, for the milder conditions encountered during other seasons of the year, can be obtained.

The leading edges of all of the cutting blades 39, with the possible exception of the outermost blade 61, are preferably curved upwardly and forwardly at 76 in order to prevent the silage from lodging upon such edges.

The lower cutting edges of the outermost blade 61 and intermediate blades 71, 72 and 73 are preferably located in substantially the same horizontal plane and at a higher elevation than the plane in which the cutting edge of the innermost blade 68 is located. The relatively low location of the cutting edge of the innermost blade 69 acts to form a shallow circular pocket in the cut upper surface of the silage, which pocket facilitates movement of the loosened silage into the same and the collection of the loosened silage by the innermost blade for delivery to the intake tube 45.

The tube 49 through which the silage is projected upwardly by the blades 48 of the fan is swiveled at 77 to the discharge outlet of the fan housing, thereby enabling the tube 49 and the trough 51 to remain stationary without interfering with rotary movement of the frame 17. As previously stated, the frame 17 in normal operation tends to rotate through part of a revolution in the direction opposite to which the rotor arm 30 is rotating due to the resistance encountered by the rotor arm in its cutting operation. The swivel connection between the tube 49 and the fan housing 47 permits of this movement as well as the corresponding movement of the lower ends of the supporting cables 24 between two of which the chute 51 projects.

The motor 53 is connected to a suitable current outlet located adjacent the top of the silo by an electric cord 78, which cord has the lower end of the same enclosed within an upright container 79 on the frame 17. When the frame 17 is in its uppermost position the cord 78 is coiled within the bottom of the container 79, and as the frame 17 descends the cord is gradually payed out through an opening 80 of reduced size in the top of the container. The upper portion 81 of the container is preferably of conical form, whereby to feed the cable out smoothly without kinking.

I claim:

1. In a silo unloader for installation in a silo above the surface of the silage, a vertically movable frame which is adapted to be centered in the silo, a radially disposed rotor arm which is rotatably connected at its inner end to the frame at the center of the latter, means on the arm for cutting the silage loose from the upper surface of the silage and moving the loosened silage in toward the center of the frame upon rotation of the arm, a rotary agitator for further loosening the loosened silage upon its arrival adjacent the center of the frame, a pick-up tube at the center of the frame having a lower open end into which said further loosened silage is adapted to be sucked by a current of air moving upwardly within the tube, a curved horizontally extending collector blade on the arm adjacent the inner end of the latter, which blade partially encircles the rotary agitator and extends first rearwardly and inwardly relative to the direction of movement of the arm and then forwardly, with the forwardly turned inner end of the blade so positioned with respect to the end of the pick-up tube as to direct the silage beneath the lower open end of the tube, said rotary agitator being nested within the curved collector blade, and said collector blade cooperating with the agitator to direct the silage from the agitator along the face of the blade to a point beneath the end of the tube, and means on the frame for rotating the arm, rotating the agitator and creating an upwardly moving current of air in the tube.

2. In a silo unloader for installation in a silo above the surface of the silage, a vertically movable frame which is adapted to be centered in the silo, a radially disposed rotor arm which is rotatably connected at its inner end to the frame at the center of the latter, means on the arm for cutting the silage loose from the upper surface of the silage and moving the loosened silage in toward the center of the frame upon rotation of the arm, a rotary agitator for further loosening the loosened silage upon its arrival adjacent the center of the frame, a pick-up tube at the center of the frame having a lower open end into which said further loosened silage is adapted to be sucked by a current of air moving upwardly within the tube, a collecting blade on the arm which extends about the agitator and the lower end of the tube and acts to direct said further loosened silage along the inner face of the blade to a point beneath the lower end of the tube, said collecting blade being of generally semi-circular form and being disposed with its lower edge a substantial distance below the lower open end of the tube, and means on the frame for rotating the arm, rotating the agitator and creating an upwardly moving current of air in the tube.

3. In a silo unloader for installation in a silo above the surface of the silage, a vertically movable frame which is adapted to be centered in the silo, a radially disposed rotor arm which is rotatably connected at its inner end to the frame at the center of the latter, a plurality of angularly disposed cutting blades on the arm for cutting the silage loose from the upper surface of the silage and moving the loosened silage in toward the center of the frame upon rotation of the arm, the outermost blade on the arm being provided with an outwardly spring pressed forward section, a roller associated with said forward section for engaging the wall of the silo and deflecting the front end of said section inwardly to maintain the same in predetermined relation to the wall, a rotary agitator for further loosening the loosened silage upon its arrival at the center of the frame, a pick-up tube at the center of the frame having a lower open end into which said further loosened silage is adapted to be sucked by a current of air moving upwardly within the tube, the innermost blade on the arm constituting a collecting blade which extends about the agitator and the lower end of the tube and acts to direct said further loosened silage along the inner face of the innermost blade to a point beneath the lower end of the tube, and means on the frame for rotating the arm, rotating the agitator and creating an upwardly moving current of air in the tube.

4. In a silo unloader for installation in a silo above the surface of the silage for use in cutting either soft or hard silage, a vertically movable frame which is adapted to be centered in the silo, a radially disposed rotor arm which is rotatably connected at its inner end to the frame at the center of the latter, horizontally elongated angularly disposed cutting blades connected to the arm for cutting the silage loose from the upper surface of the silage, means for conducting the loosened silage to a point outside the silo, certain of said blades being detachably connected with the arm and provided with both plain and serrated horizontal cutting edges and each being individually reversible top for bottom and end for end relative to the arm whereby to permit either the plain edges or the serrated edges of the blades to engage the surface of the silage, and means for rotating the arm and operating said conducting means.

5. In a silo unloader for installation in a silo above the surface of the silage for use in cutting either soft or hard silage, a vertically movable frame which is adapted to be centered in the silo, a radially disposed rotor arm which is rotatably connected at its inner end to the frame at the center of the latter, horizontally elongated angularly disposed cutting blades connected to the arm for cutting the silage loose from the upper surface of the silage, means for conducting the loosened silage to a point outside the silo, certain of said blades being detachably connected with the arm and provided with both plain and serrated horizontal cutting edges and each being individually reversible top for bottom and end for end relative to the arm whereby to permit either the plain edges or the serrated edges of the blades to engage the surface of the silage, and means for rotating the arm and operating said conducting means, the leading edges of said reversible blades being curved upwardly and forwardly, and the serrations on the blades being formed by sharp pointed teeth having upwardly and rearwardly inclined leading edges.

6. In a silo unloader for installation in a silo above the surface of the silage, a vertically movable frame which is adapted to be centered in the silo, means associated with the frame for cutting the silage loose from the upper surface of the silage and conducting the loosened silage to a point outside the silo, an electric motor mounted on the frame for operating said last mentioned means, an electric cord leading from the motor to a point adjacent the top of the silo, and a pay-out container for the cord mounted on the frame, which container is adapted to hold the cord in the form of a coil and is provided with an opening of reduced size in the top thereof through which the cord is payed out from the coil during downward movement of the frame.

7. In a silo unloader for installation in a silo above the surface of the silage, a vertically movable frame which is adapted to be centered in the silo, means associated with the frame for cutting the silage loose from the upper surface of the silage and conducting the loosened silage to a point outside the silo, an electric motor mounted on the frame for operating said last mentioned means, an electric cord leading from the motor to a point adjacent the top of the silo, and a pay-out container for the cord mounted on the frame, which container is adapted to hold the cord in the form of a coil and is provided with an opening of reduced size in the top thereof through which the cord is payed out from the coil during downward movement of the frame, said container being of cylindrical form and being provided adjacent the top thereof with an upwardly converging conical portion in the apex of which said opening is located.

GEORGE D. CLAPP.

REFERENCES CITED

The following references are of record in the file of this patent:

UNITED STATES PATENTS

| Number | Name | Date |
|---|---|---|
| 826,646 | Blaisdell | July 24, 1906 |
| 894,618 | Ferguson | July 28, 1908 |
| 1,007,954 | Lamb | Nov. 7, 1911 |
| 1,059,658 | Conner | Apr. 22, 1913 |
| 1,233,308 | Burgess | July 17, 1917 |
| 1,550,311 | Foster | Aug. 18, 1925 |
| 1,740,250 | Kutz, Sr. et al. | Dec. 17, 1929 |
| 1,971,425 | Morrow | Aug. 28, 1934 |
| 2,148,501 | Rasor | Feb. 28, 1939 |